United States Patent
Tang et al.

(10) Patent No.: US 10,733,425 B2
(45) Date of Patent: Aug. 4, 2020

(54) METHOD AND RELATED PRODUCT FOR RECOGNIZING LIVE FACE

(71) Applicant: GUANGDONG OPPO MOBILE TELECOMMUNICATIONS CORP., LTD., Dongguan, Guangdong (CN)

(72) Inventors: Cheng Tang, Dongguan (CN); Xueyong Zhang, Dongguan (CN); Yibao Zhou, Dongguan (CN); Haitao Zhou, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 19 days.

(21) Appl. No.: 16/027,708

(22) Filed: Jul. 5, 2018

(65) Prior Publication Data
US 2019/0019015 A1 Jan. 17, 2019

(30) Foreign Application Priority Data
Jul. 17, 2017 (CN) .......................... 2017 1 0582651

(51) Int. Cl.
*G06K 9/00* (2006.01)
*G06T 7/20* (2017.01)
*H04N 5/225* (2006.01)
*H04N 5/232* (2006.01)

(52) U.S. Cl.
CPC ..... *G06K 9/00288* (2013.01); *G06K 9/00281* (2013.01); *G06K 9/00597* (2013.01);
(Continued)

(58) Field of Classification Search
None
See application file for complete search history.

(56) References Cited

U.S. PATENT DOCUMENTS

| 7,561,791 B2 | 7/2009 | Kakiuchi |
| 8,698,914 B2 | 4/2014 | Irmatov |
| (Continued) | | |

FOREIGN PATENT DOCUMENTS

| CN | 1584917 A | 2/2005 |
| CN | 1834987 A | 9/2006 |
| (Continued) | | |

OTHER PUBLICATIONS

International Search Report in international application No. PCT/CN2018/091875, dated Sep. 21, 2018.
(Continued)

*Primary Examiner* — Shadan E Haghani
(74) *Attorney, Agent, or Firm* — Ladas & Parry, LLP

(57) ABSTRACT

Disclosed are a method and a related product for recognizing a live face. The method is applied to a terminal device including a front light emitting source, a front camera and an Application Processor (AP). The method includes the following actions. Upon reception of a face image collection instruction, the camera collects a first face image of a face when the source is in a first state. The camera collects a second face image of the face when the source is in a second state. The AP determines whether a difference between an eyeball area proportion in the first face image and an eyeball area proportion in the second face image is larger than a preset threshold; and if so, the AP determines that the collected face images are images of a live face.

18 Claims, 6 Drawing Sheets

(52) U.S. Cl.
CPC ............. *G06T 7/20* (2013.01); *H04N 5/2256* (2013.01); *H04N 5/23219* (2013.01); *G06T 2207/10016* (2013.01); *G06T 2207/30201* (2013.01)

(56) References Cited

U.S. PATENT DOCUMENTS

| | | | |
|---|---|---|---|
| 8,856,541 B1* | 10/2014 | Chaudhury | G06F 21/32 |
| | | | 382/115 |
| 9,779,308 B2* | 10/2017 | Kuwahara | G08B 13/19669 |
| 10,152,792 B2* | 12/2018 | Kim | G06K 9/00597 |
| 10,372,973 B2* | 8/2019 | Davis | G06K 9/00268 |
| 2006/0210261 A1 | 9/2006 | Kakiuchi | |
| 2010/0202667 A1 | 8/2010 | Ren | |
| 2012/0140091 A1 | 6/2012 | Irmatov | |
| 2016/0117544 A1 | 4/2016 | Hoyos et al. | |
| 2016/0140390 A1* | 5/2016 | Ghosh | G06K 9/00597 |
| | | | 348/78 |
| 2017/0344793 A1 | 11/2017 | Xue et al. | |

FOREIGN PATENT DOCUMENTS

| | | |
|---|---|---|
| CN | 102483851 A | 5/2012 |
| CN | 104781830 A | 7/2015 |
| CN | 104992163 A | 10/2015 |
| CN | 105354545 A | 2/2016 |
| CN | 106663201 A | 5/2017 |
| CN | 106778607 A | 5/2017 |
| CN | 107292290 A | 10/2017 |

OTHER PUBLICATIONS

Written Opinion of the International Search Authority in international application No. PCT/CN2018/091875, dated Sep. 21, 2018.

Ahmed et al., "Iris Anti-spoofing: Static and Dynamic Technique", JournalPart (B, Jan. 1, 2016 (Jan. 1, 2016), XP055525057, Retrieved from the Internet: URL: https:// pdfs.semanticscholar.org/7690/70fdc498bafe6276e02f4b7532ff03810b6a.pdf * "Dynamic Technique"; p. 601 *.

Komal et al., "Liveness Detection in Different Biometric Traits: An Overview", International Journal of Advanced Research in Computer Science, May 1, 2017 (May 1, 2017), XP055525348, Udaipur Retrieved from the Internet: URL: http://www.ijarcs.info/index.php/ijarcs/article/viewFile/3799/3658 * figure 2 *.

Jee et al., "Liveness Detection for Embedded Face Recognition System", World Academy of Science, Engineering and Technology 18, Jan. 1, 2008 (Jan. 1, 2008), XP055359123, Retrieved from the Internet: URL:http://citeseerx.ist.psu.edu/viewdoc/download?doi=10.1.1.307.9254&rep=rep1&type=pdf [retrieved on Mar. 27, 2017] * the whole document *.

Huang et al., "An experimental study of pupil constriction for liveness detection", Applications of Computer Vision (WACV), 2013 IEEE Workshop On, IEEE, Jan. 15, 2013 (Jan. 15, 2013), pp. 252-258, XP032339497, DOI: 10.1109/WACV.2013.6475026 ISBN: 978-1-4673-5053-2 * the whole document *.

Supplementary European Search Report in European application No. 18178453.9, dated Dec. 4, 2018.

Yang, Tiejun etc, "Key Technology 2 Face Recognition", Industrial Patent Analysis Report—(vol. 33) Intelligent Identification, Jun. 30, 2015, p. 244, paragraph 2 and p. 246, paragraph 1.

Wang, Bin etc, "Face Recognition Based on Android", The Theory and Practice of College Student Association Construction, Jun. 30, 2014, p. 29, section 2.2, paragraph 1.

Second Office Action of the Chinese application No. 201710582651.X, dated Oct. 30, 2019.

* cited by examiner

METHOD AND RELATED PRODUCT FOR RECOGNIZING LIVE FACE

CROSS-REFERENCE TO RELATED APPLICATION

The present application claims benefit of Chinese Patent Application 201710582651.X, filed on Jul. 17, 2017, the contents of which are hereby incorporated by reference in its entirety.

TECHNICAL FIELD

The present disclosure relates to the technical field of terminal devices, and in particular to a method and related product for recognizing a live face.

BACKGROUND

With the popularization of terminal devices such as mobile phones and tablet computers, people in modern life basically have a mobile phone. In order to ensure the security of mobile phones, current mobile phones generally use biometric technologies such as fingerprint recognition and face recognition, wherein face recognition has been widely used in mobile phone unlocking, mobile payment and other aspects due to the advantages such as high recognition speed.

However, faces are easily forged and less secure. For example, after lawbreakers have obtained photos of a mobile phone owner, they can use the face photos of the mobile phone owner to perform face recognition. It can be seen that the current face recognition is less secure.

SUMMARY

According to a first aspect of the disclosure, a method for recognizing a live face is provided, and the method includes the actions as follows.

In response to a terminal device receiving a face image collection instruction, a front camera collects a first face image of a face when a front light emitting source is in a first state, the terminal device including the front light emitting source, the front camera and an Application Processor (AP).

The front camera collects a second face image of the face when the front light emitting source is in a second state.

The AP determines whether a difference between an eyeball area proportion in the first face image and an eyeball area proportion in the second face image is larger than a preset threshold.

In response to the difference between an eyeball area proportion in the first face image and an eyeball area proportion in the second face image being larger than the preset threshold, the AP determines that the collected face images are images of a live face.

According to a second aspect of the disclosure, a terminal device is provided, which includes a front light emitting source, a front camera and an AP.

The front camera is configured to in response to the terminal device receiving a face image collection instruction, collect a first face image of a face when the front light emitting source is in a first state.

The front camera is further configured to collect a second face image of the face when the front light emitting source is in a second state.

The AP is configured to determine whether a difference between an eyeball area proportion in the first face image and an eyeball area proportion in the second face image is larger than a preset threshold.

The AP is further configured to in response to the difference between the eyeball area proportion in the first face image and the eyeball area proportion in the second face image being larger than the preset threshold, determine that the collected face images are images of a live face.

According to a third aspect of the disclosure, a non-transitory computer-readable storage medium is provided, which is configured to store a computer program for electronic data exchange. The computer program enables a computer to execute some or all actions described in any one method in the first aspect of the embodiments of the disclosure.

BRIEF DESCRIPTION OF DRAWINGS

In order to more clearly illustrate the technical solutions in the embodiments of the disclosure or the conventional art, accompanying drawings needing to be used in the descriptions of the embodiments or the conventional art will be simply introduced hereinbelow. Obviously, the drawings described hereinbelow are merely some embodiments of the disclosure. Without making creative works, a person of ordinary skill in the art may also obtain other drawings according to these drawings.

DETAILED DESCRIPTION

Figure 1A:
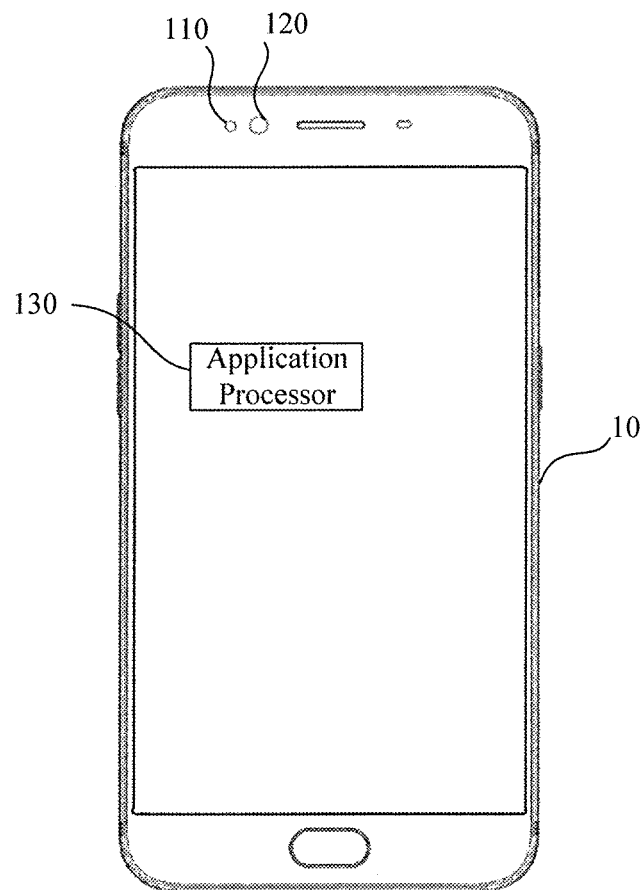
FIG. 1A is a working principle diagram of face recognition according to an embodiment of the disclosure.

In order to make a person skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments of the disclosure, all other embodiments obtained on the premise of no creative work of a person skilled in the art should fall within the scope of protection of the disclosure.

The specification and claims of the disclosure and terms "first", "second" and the like in the drawings are used for distinguishing similar objects rather than describing a specific sequence. In addition, terms "include" and "have" and any inflexions thereof are intended to cover non-exclusive inclusions. For example, processes, methods, systems, products or devices containing a series of actions or units are not limited to actions or units which have been already listed, and other actions or units which are not listed or are inherent to these processes, methods, products or devices are alternatively included instead.

Mentioning of "Embodiments" in the disclosure means that specific features, structures or characteristics described in the embodiments may be included in at least one embodiment of the disclosure. The phrase occurring at each position in the specification is not always the same embodiment, or not an independent or alternative embodiment mutually exclusive to other embodiments. A person skilled in the art explicitly and implicitly understands that the embodiments described in the disclosure may be combined with other embodiments.

The terminal device involved in the embodiments of the disclosure may include various handheld devices with a wireless communication function, on-board devices, wearable devices, computing devices or other processing devices connected to a wireless modem, and various forms of User Equipment (UE), Mobile Stations (MSs), terminal devices, etc. For convenience of description, the above-mentioned devices are collectively referred to as terminal devices.

The following introduces the embodiments of the disclosure in detail.

In order to better understand the embodiments of the disclosure, the working principle of face recognition in the embodiments of the disclosure is first introduced. Please refer to FIG. 1A. FIG. 1A is a working principle diagram of face recognition according to an embodiment of the disclosure. Face recognition in FIG. 1A is applied to a terminal device. A mobile phone is adopted as the terminal device. As shown in FIG. 1A, both a front light emitting source 110 and a front camera 120 are arranged on the front of a mobile phone 10, where the front camera 120 is configured to collect a face image. An application processor (AP) 130 processes the collected face image and then matches the face image with a pre-stored face image template. When matching is successful, it is considered that verification of face recognition is passed. The front light emitting source 110 may be a front flash for assisting in determining whether the collected face images are images of a live face.

Figure 1B:
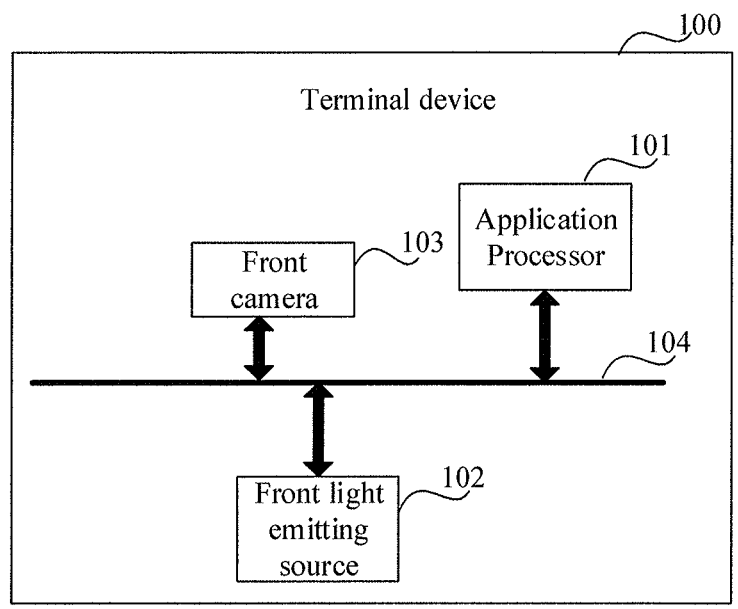
FIG. 1B is a structure diagram of a terminal device according to an embodiment of the disclosure.

Please refer to FIG. 1B. FIG. 1B is a structure diagram of a terminal device according to an embodiment of the disclosure. As shown in FIG. 1B, a terminal device 100 includes an AP 101, a front light emitting source 102 and a front camera 103. The AP 101 is connected to the front light emitting source 102 and the front camera 103 via a bus 104.

The AP 101 is configured to when the terminal device 100 receives a face image collection instruction, control the front camera 103 to collect a first face image of a face when the front light emitting source 102 is in a first state. For example, the first state may be an OFF state.

The terminal device 100 may receive a face image collection instruction triggered based on an input operation of a user on a touch display screen. For example, when an application scenario is a screen unlocking scenario, after the touch display screen is in an ON state, a selection prompt box may pop up on the touch display screen to guide the user to select one of "iris recognition", "fingerprint recognition" and "face recognition". When the user clicks on "face recognition" in the selection prompt box, the face image collection instruction may be triggered. The terminal device 100 may also trigger generation of a face image collection instruction when it is detected that the user picks up the terminal device 100. For example, when the application scenario is a screen unlocking scenario, when a gesture sensor of the terminal device 100 (for example, a gravity sensor, a three-axis gyroscope, a three-axis acceleration sensor, etc.) detects that the user has lifted the terminal device 100, the terminal device 100 may be triggered to generate a face image collection instruction.

The AP 101 is further configured to control the front camera 103 to collect a second face image of the face when the front light emitting source 102 is in a second state. For example, the second state may be an ON state.

Herein, the front light emitting source 102 may be a front flash, or may be a display screen backlight source, or may be the combination of a front flash and a display screen backlight source. The front flash may be arranged nearby the front camera 103, and the front flash may be used to fill light when the front camera shoots. The display backlight source may be an LED backlight source. When it is detected that the user has lifted the terminal device 100, the front camera 103 is controlled to collect a first face image of a face when the display screen is in an OFF state, and then the display screen of the terminal device is in an ON state. The front camera 103 may be controlled to collect a second face image of the face when the display screen of the terminal device is in the ON state.

Herein, the front camera 103 may send the collected first face image and second face image to the AP 101 for processing.

The AP 101 is further configured to determine whether a difference between an eyeball area proportion in the first face image and an eyeball area proportion in the second face image is larger than a preset threshold. For example, the difference may be an absolute value.

In the embodiments of the disclosure, when the front light emitting source 102 is a front flash, the front camera 103 may shoot a first face image and a second face image of a face respectively when the front flash is in an OFF state and an ON state. When the front flash is turned off, the face of the user cannot be stimulated by strong light, eyes in the first face image are in a normal opening state. When the front flash is turned on, the face of the user is stimulated by strong light, and eyes in the second face image are likely to be in a blinking or closing state.

An eyeball area proportion is a ratio of the area of an eyeball area in a face image to the area of the entire face image. The AP 101 determines whether a difference between an eyeball area proportion in the first face image and an eyeball area proportion in the second face image is larger than a preset threshold, in order to determine whether the collected face images are images of a live face, that is, whether an object shot by the front camera is a live face. If the shot object is a live face, the eyeball area proportion in the first face image and the eyeball area proportion in the second face image will change greatly since the pupils of human eyes are contracted by strong light stimulus, and a difference between the eyeball area proportion in the first face image and the eyeball area proportion in the second face image is larger than a preset threshold. If the shot object is not a live face (such as a dead person's eyeball or photo), the eyeball area proportion in the first face image and the eyeball area proportion in the second face image will not generally change greatly, and a difference between the eyeball area proportion in the first face image and the eyeball area proportion in the second face image is smaller than the preset threshold. In the embodiments of the disclosure, it is determined whether the collected face images are images of a live face by determining whether the difference between the eyeball area proportion in the first face image and the eyeball area proportion in the second face image is larger than the preset threshold when the front light emitting source is in an OFF or ON state, and the live face recognition algorithm is simple.

The AP 101 is further configured to determine, when the difference between the eyeball area proportion in the first face image and the eyeball area proportion in the second face image is larger than the preset threshold, that the collected face images are images of a live face.

Alternatively, the AP 101 is further configured to determine, when the difference between the eyeball area proportion in the first face image and the eyeball area proportion in the second face image is smaller than or equal to the preset threshold, that the collected face images are images of a non-live face.

In the embodiments of the disclosure, when the difference between the eyeball area proportion in the first face image and the eyeball area proportion in the second face image is smaller than or equal to the preset threshold, it is shown that the difference between the face images shot by the front camera under different illumination intensities is small, and it can be considered that the collected face images are images of a non-live face.

Alternatively, the AP 101 is further configured to take, after determining that the collected face images are images of a live face, an image with a larger eyeball area proportion out of the first face image and the second face image as a valid face image.

The AP 101 is further configured to verify whether the valid face image is matched with a pre-stored face image template.

The AP 101 is further configured to determine, when the valid face image is matched with the pre-stored face image template, that face recognition is passed.

In the embodiments of the disclosure, the face image template may include face features such as face eye features (such as eyeball sizes and shapes, and eye spacing), eye nose features (nostril spacing, nose tip length, etc.), and eye mouth features (lip thickness, lip length, etc.), combination characteristics (distance from nostrils to left and right eyes, distance from a left eye to a lip, etc.).

Alternatively, before verifying whether the valid face image is matched with a pre-stored face image template, the AP 101 may convert the valid face image into a standardized image, standardization processing here including pixel standardization, image size standardization, etc.

Alternatively, the AP 101 controls the front camera to collect a second face image of the face when the front light emitting source is in an ON state in the following specific manner.

The AP 101 controls the front camera to collect a second face image of the face when the front light emitting source is at a first power.

The AP 101 is further configured to control, when the difference between the eyeball area proportion in the first face image and the eyeball area proportion in the second face image is smaller than or equal to the preset threshold and is larger than zero, the front camera to collect a third face image of the face when the front light emitting source is at a second power, the second power being larger than the first power.

The AP 101 is further configured to determine whether a difference between the eyeball area proportion in the first face image and an eyeball area proportion in the third face image is larger than the preset threshold.

The AP 101 is further configured to determine, when the difference between the eyeball area proportion in the first face image and the eyeball area proportion in the third face image is larger than the preset threshold, that the collected face images are images of a live face.

In the embodiments of the disclosure, when the difference between the eyeball area proportion in the first face image and the eyeball area proportion in the second face image is smaller than or equal to the preset threshold and is larger than zero, it is shown that eyes in the first face image and the second face image shot by the front camera undergo minor changes. In order to prevent misjudgment as a live face, the AP controls the front camera to continue to collect a third face image of the face when the front light emitting source is at a second power, the power of the front light emitting source is increased, that is, the light filling intensity when the front camera shoots a face image is increased, and the method of increasing the light filling intensity is adopted to further determine whether the collected face image is a face image, thereby preventing misjudgment of a live object as a non-live object.

Alternatively, the difference between the second power and the first power may be preset, so as to prevent the excessive power of the front light emitting source from causing a greater stimulus to a human eye.

Alternatively, the AP 101 is further configured to set, after determining the collected face image as an image of a live face, the turn-on power of the front camera as a second power during subsequent face recognition.

In the embodiments of the disclosure, the working power of the front light emitting source when the live face recognition is successful may be used as the working power of the front light emitting source in the next live face recognition, and the accuracy of live face recognition may be improved.

By implementing the terminal device shown in FIG. 1B, when the terminal device performs live face recognition, a front light emitting source may be used to collect a first face image and a second face image of a face respectively when it is in an OFF state and an ON state, and the characteristics of blinking or closing of human eyes under strong light are used to determine whether the collected face images are images of a live face. The recognition algorithm is simple and may rapidly detect whether a face is a live face, thereby improving the security of face recognition.

Figure 2:
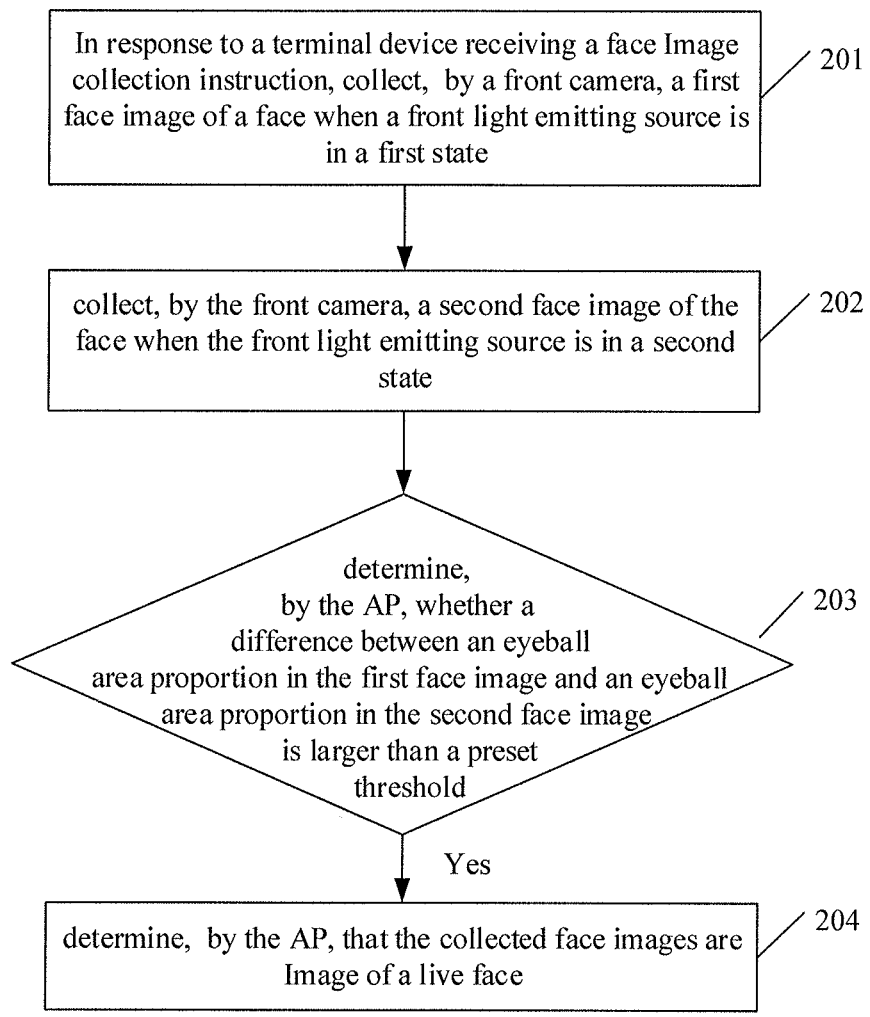
FIG. 2 is a flowchart of a method for recognizing a live face according to an embodiment of the disclosure.

Please refer to FIG. 2. FIG. 2 is a flowchart of a method for recognizing a live face according to an embodiment of the disclosure. The method is applied to a terminal device including a front light emitting source, a front camera and an AP. As shown in FIG. 2, the method includes the actions as follows.

201: When the terminal device receives a face image collection instruction, the front camera collects a first face image of a face when the front light emitting source is in an OFF state.

202: The front camera collects a second face image of the face when the front light emitting source is in an ON state.

203: The AP determines whether a difference between an eyeball area proportion in the first face image and an eyeball area proportion in the second face image is larger than a preset threshold. If so, step 204 is executed, and if not, step 205 is executed.

204: The AP determines that the collected face images are images of a live face.

205: The AP determines that the collected face images are non-live face images.

By implementing the method shown in FIG. 2, when the terminal device performs live face recognition, a front light emitting source may be used to collect a first face image and a second face image of a face respectively when it is in an OFF state and an ON state, and the characteristics of blinking or closing of human eyes under strong light are used to determine whether the collected face images are images of a live face. The recognition algorithm is simple and may rapidly detect whether a face is a live face, thereby improving the security of face recognition.

Figure 3:
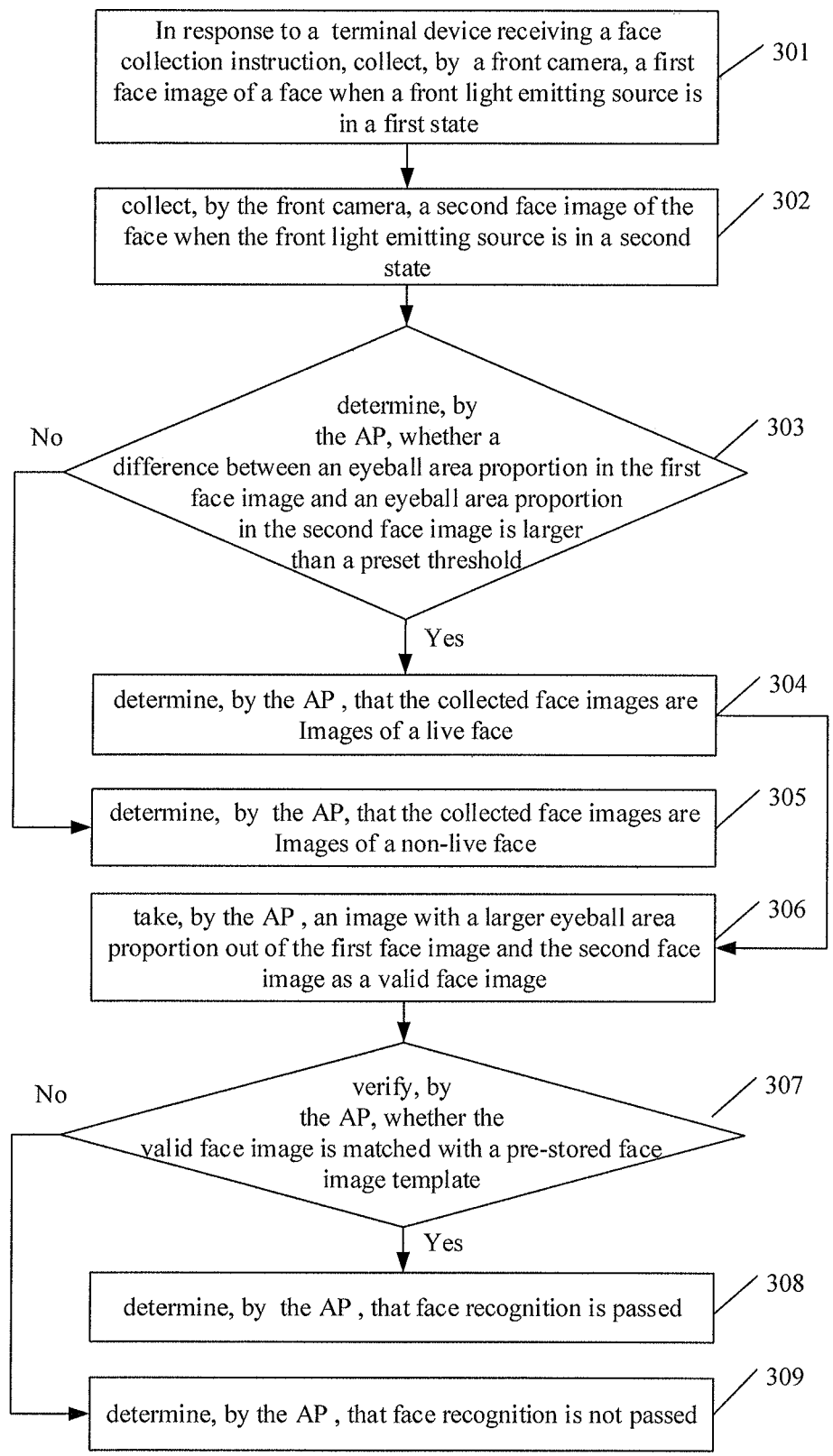
FIG. 3 is a flowchart of another method for recognizing a live face according to an embodiment of the disclosure.

Please refer to FIG. 3. FIG. 3 is a flowchart of another method for recognizing a live face according to an embodiment of the disclosure. The method is applied to a terminal device including a front light emitting source, a front camera and an AP. The method includes the actions as follows.

301: When the terminal device receives a face image collection instruction, the front camera collects a first face image of a face when the front light emitting source is in an OFF state.

302: The front camera collects a second face image of the face when the front light emitting source is in an ON state.

303: The AP determines whether a difference between an eyeball area proportion in the first face image and an eyeball area proportion in the second face image is larger than a preset threshold. If so, step 304 is executed, and if not, step 305 is executed.

304: The AP determines that the collected face images are images of a live face.

305: The AP determines that the collected face images are non-live face images.

306: The AP takes an image with a larger eyeball area proportion out of the first face image and the second face image as a valid face image.

307: The AP verifies whether the valid face image is matched with a pre-stored face image template. If so, step 308 is executed, and if not, step 309 is executed.

308: The AP determines that face recognition is passed.

309: The AP determines that face recognition is not passed.

By implementing the method shown in FIG. 3, when the terminal device performs live face recognition, a front light emitting source may be used to collect a first face image and a second face image of a face respectively when it is in an OFF state and an ON state, and the characteristics of blinking or closing of human eyes under strong light are used to determine whether the collected face images are images of a live face. The recognition algorithm is simple and may rapidly detect whether a face is a live face, thereby improving the security of face recognition.

Figure 4:
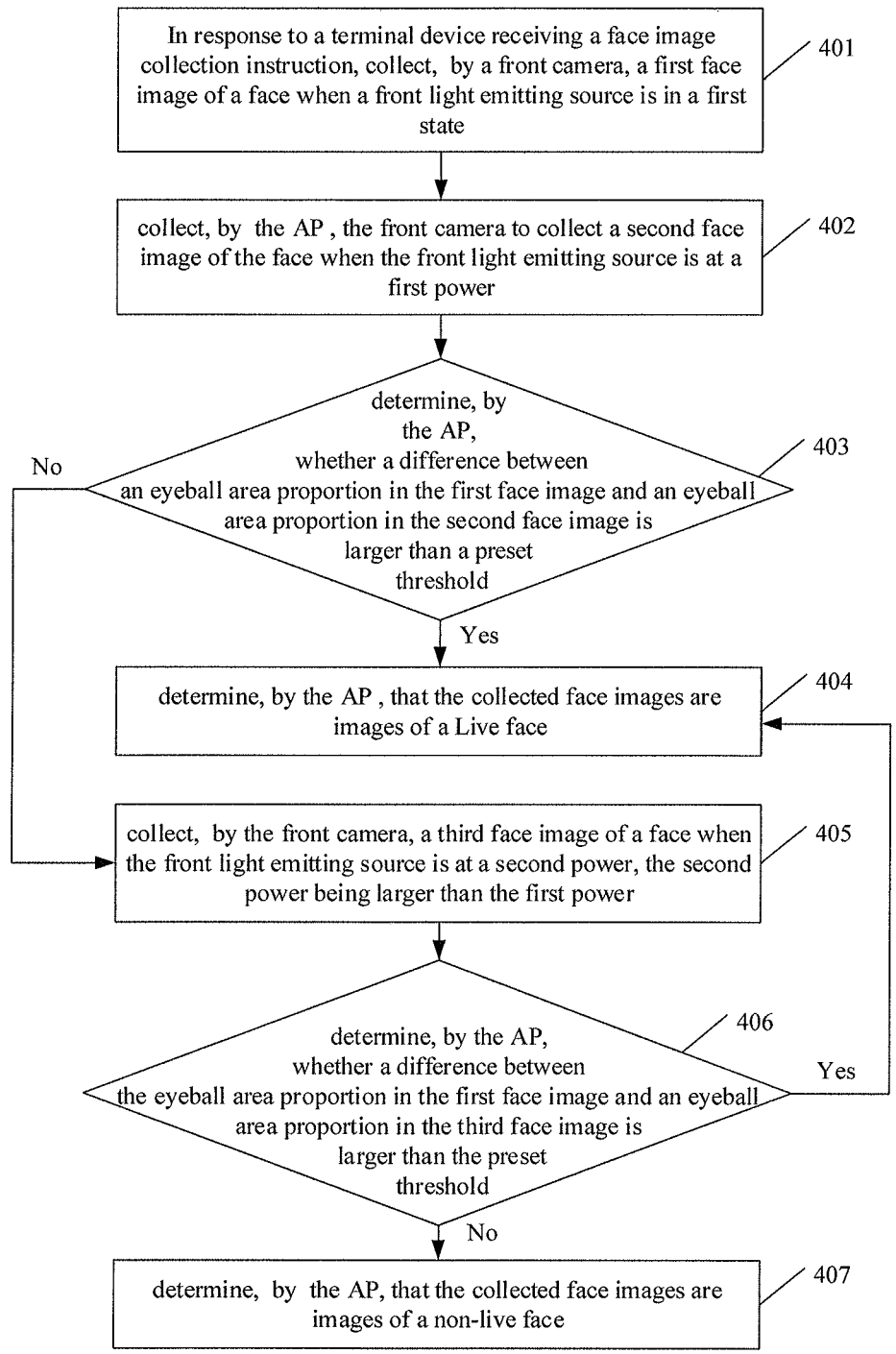
FIG. 4 is a flowchart of yet another method for recognizing a live face according to an embodiment of the disclosure.

Please refer to FIG. 4. FIG. 4 is a flowchart of yet another method for recognizing a live face according to an embodiment of the disclosure. The method is applied to a terminal device including a front light emitting source, a front camera and an AP. The method includes the actions as follows.

401: When the terminal device receives a face image collection instruction, the front camera collects a first face image of a face when the front light emitting source is in an OFF state.

402: The front camera collects a second face image of the face when the front light emitting source is at a first power.

403: The AP determines whether a difference between an eyeball area proportion in the first face image and an eyeball area proportion in the second face image is larger than a preset threshold. If so, step 404 is executed, and if not, step 405 is executed.

404: The AP determines that the collected face images are images of a live face.

405: The front camera collects a third face image of the face when the front light emitting source is at a second power, the second power being larger than the first power.

406: The AP determines whether a difference between the eyeball area proportion in the first face image and an eyeball area proportion in the third face image is larger than the preset threshold. If so, step 404 is executed, and if not, step 407 is executed.

407: The AP determines that the collected face images are non-live face images.

By implementing the method shown in FIG. 4, when the terminal device performs live face recognition, a front light emitting source may be used to collect a first face image and a second face image of a face respectively when it is in an OFF state and an ON state, and the characteristics of blinking or closing of human eyes under strong light are used to determine whether the collected face images are images of a live face images. The recognition algorithm is simple and may rapidly detect whether a face is a live face, thereby improving the security of face recognition.

Figure 5:
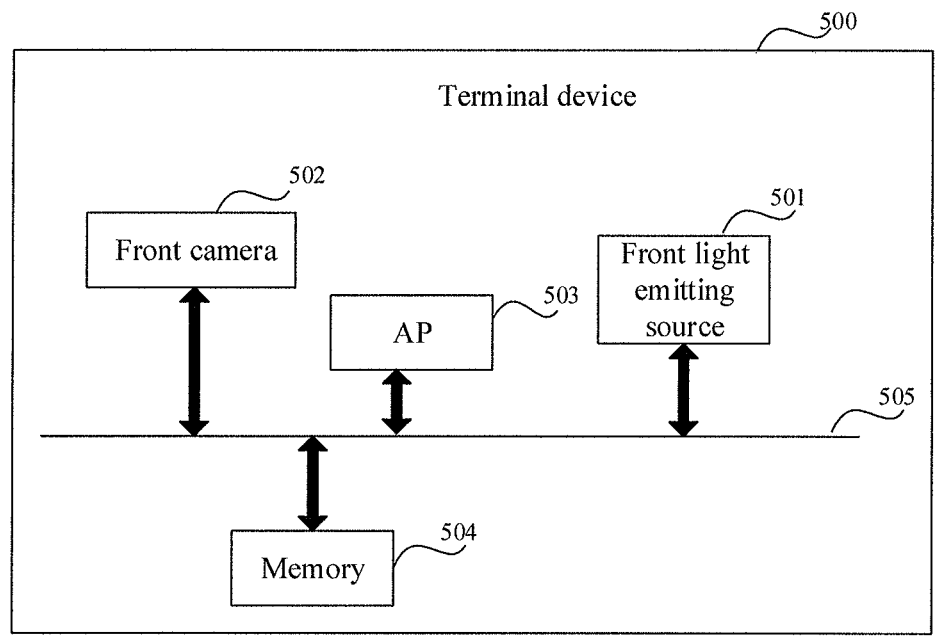
FIG. 5 is a structure diagram of a terminal device according to an embodiment of the disclosure.

Please refer to FIG. 5. FIG. 5 is a structure diagram of a terminal device according to an embodiment of the disclosure. The terminal device 500 includes a front light emitting source 501, a front camera 502, an AP 503, and a memory 504, where the front light emitting source 501, the front camera 502, the AP 503 and the memory 504 may be connected via a communication bus 505, and the memory 505 is configured to store one or more programs, the one or more programs being configured to be executed by the AP 504, the program including an instruction for executing the following actions.

When the terminal device receives a face image collection instruction, the front camera 502 collects a first face image of a face when the front light emitting source 501 is in an OFF state.

The front camera 502 collects a second face image of the face when the front light emitting source 501 is in an ON state.

Whether a difference between an eyeball area proportion in the first face image and an eyeball area proportion in the second face image is larger than a preset threshold, is determined.

When the difference between an eyeball area proportion in the first face image and an eyeball area proportion in the second face image is larger than a preset threshold is larger than the preset threshold, it is determined that the collected face images are images of a live face.

Alternatively, the program further includes an instruction for executing the following actions.

An image with a larger eyeball area proportion out of the first face image and the second face image is taken as a valid face image.

Whether the valid face image is matched with a pre-stored face image template, is verified.

When the valid face image is matched with the pre-stored face image template, it is determined that face recognition is passed.

Alternatively, the program further includes an instruction for executing the following actions.

When the difference between the eyeball area proportion in the first face image and the eyeball area proportion in the second face image is smaller than or equal to the preset threshold, it is determined that the collected face images are non-live face images.

Alternatively, for collecting, by the front camera 502, a second face image of the face when the front light emitting source 501 is in an ON state, the program is specifically configured to execute the following action.

The front camera 502 collects a second face image of the face when the front light emitting source 501 is at a first power.

The program further comprises an instruction for executing the following actions.

After determining whether a difference between an eyeball area proportion in the first face image and an eyeball area proportion in the second face image is larger than a preset threshold, when the difference between the eyeball area proportion in the first face image and the eyeball area proportion in the second face image is smaller than or equal to the preset threshold and is larger than zero, the front camera 502 collects a third face image of the face when the front light emitting source 501 is at a second power. The second power is larger than the first power.

Whether a difference between the eyeball area proportion in the first face image and an eyeball area proportion in the third face image is larger than the preset threshold, is determined.

When the difference between the eyeball area proportion in the first face image and an eyeball area proportion in the third face image is larger than the preset threshold is larger than the preset threshold, it is determined that the collected face images are images of a live face.

Alternatively, the front light emitting source 501 includes at least one of a front flash or a display screen backlight source.

By implementing the terminal device shown in FIG. 5, a front light emitting source may be used to collect a first face image and a second face image of a face respectively when it is an OFF state and an ON state, and the characteristics of blinking or closing of human eyes under strong light are used to determine whether the collected face images are images of a live face. The recognition algorithm is simple and may rapidly detect whether a face is a live face, thereby improving the security of face recognition.

Figure 6:
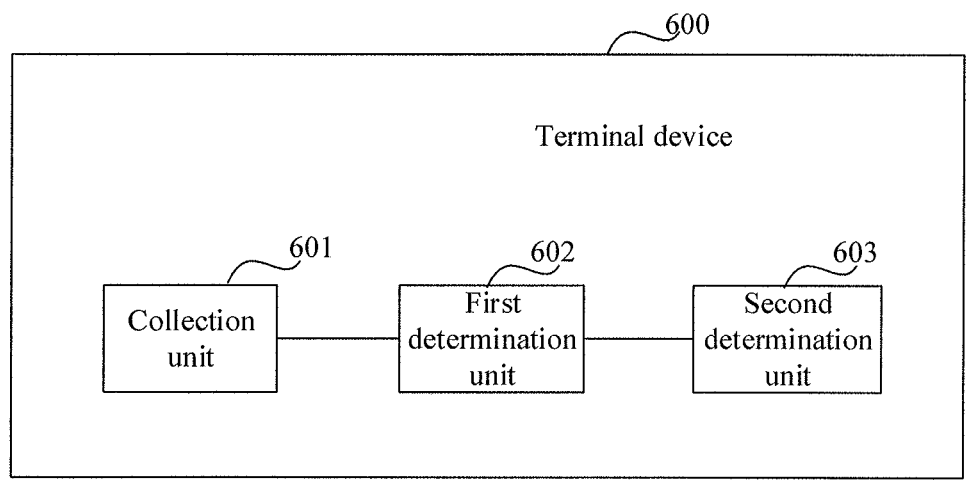
FIG. 6 is a structure diagram of another terminal device according to an embodiment of the disclosure.

Please refer to FIG. 6. FIG. 6 is a structure diagram of another terminal device according to an embodiment of the disclosure. The terminal device 600 includes a collection unit 601, a first determination unit 602 and a second determination unit 603.

The collection unit 601 is configured to control, when the terminal device receives a face image collection instruction, the front camera to collect a first face image of a face when the front light emitting source is in an OFF state.

The collection unit 601 is further configured to control the front camera through an AP to collect a second face image of the face when the front light emitting source is in an ON state.

The first determination unit 602 is configured to determine whether a difference between an eyeball area proportion in the first face image and an eyeball area proportion in the second face image is larger than a preset threshold.

The second determination unit 603 is configured to determine, when the judgment result of the first determination unit is yes, that the collected face images are images of a live face.

The implementation of the terminal device may refer to the method embodiment as shown in FIGS. 2 to 4, and the repeated description is omitted.

By implementing the terminal device shown in FIG. 6, a front light emitting source may be used to collect a first face image and a second face image of a face respectively when it is in an OFF state and an ON state, and the characteristics of blinking or closing of human eyes under strong light are used to determine whether the collected face images are images of a live face. The recognition algorithm is simple and may rapidly detect whether a face is a live face, thereby improving the security of face recognition.

Figure 7:
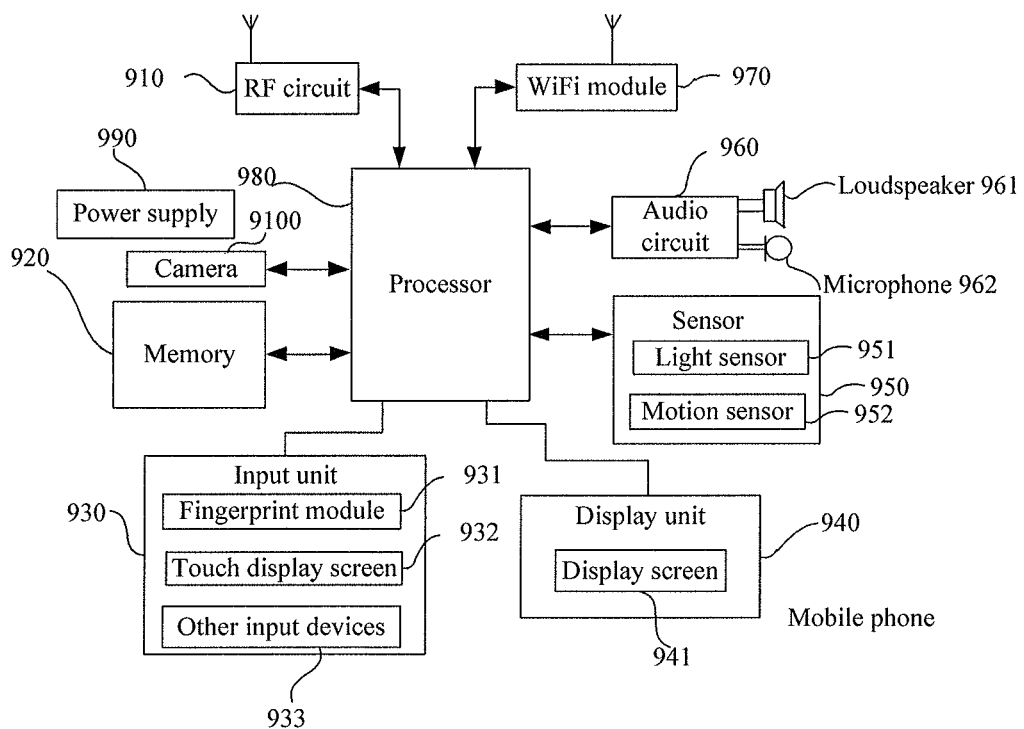
FIG. 7 is a structure diagram of yet another terminal device according to an embodiment of the disclosure.

The embodiments of the disclosure also provide another terminal device, as shown in FIG. 7. For convenience of description, only parts associated with the embodiments of the disclosure are shown. Specific technical details that are not disclosed refer to parts of the method in the embodiments of the disclosure. The terminal device may be any terminal device including a mobile phone, a tablet computer, a Personal Digital Assistant (PDA), a Point of Sales (POS) and an on-board computer. A mobile phone is taken as the terminal device.

FIG. 7 shows a partial structure diagram illustrating a mobile phone associated with a terminal device according to an embodiment of the disclosure. Referring to FIG. 7, the mobile phone includes: an RF circuit 910, a memory 920, an input unit 930, a display unit 940, a sensor 950, an audio circuit 960, a Wireless Fidelity (WiFi) module 970, a processor 980, a power supply 990, and other parts. A person skilled in the art may understand that a mobile phone structure shown in FIG. 8 is not limitative to the mobile phone, and the mobile phone may include parts more or fewer than those shown in the figure, or combine some parts, or have different part arrangements.

Each component of the mobile phone will be specifically introduced below in conjunction with FIG. 7.

The RF circuit 910 may be configured to receive and transmit information. Usually, the RF circuit 910 includes, but not limited to, an antenna, at least one amplifier, a transceiver, a coupler, an LNA, a duplexer, etc. In addition, the RF circuit 910 may further communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 920 may be configured to store a software program and a module, and the processor 980 executes various function APPs and data processing of the mobile phone by running the software program and the module stored in the memory 920. The memory 920 may mainly include a storage program region and a storage data region, where the storage program region may store an operation system, an APP needed for at least one function (a program for releasing a dedicated memory resource), etc; and the storage data region may store data (such as a preset duration) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition module 931, a touch display screen 932 and other input devices 933. The fingerprint recognition module 931 may collect fingerprint data of a user thereon. The input unit 930 may further include, in addition to the fingerprint recognition module 931, other input devices 932. Specifically, the other input devices 932 may include, but are not limited to, one or more of a physical keyboard, a functional key (such as a volume control key and a switch key), a track ball, a mouse and an operating rod.

The display unit 940 may be configured to display information input by the user or information provided for the user or various menus of the mobile phone. The display unit 940 may include a display screen 941, and alternatively, the display screen 941 may be configured in a form of a Liquid Crystal Display (LCD), an Organic Light-Emitting Diode (OLED), etc. Although, the fingerprint recognition module 931 and the display screen 941 implement input of the mobile phone and input functions by serving as two independent parts in FIG. 8, the fingerprint recognition module 931 and the display screen 941 may be integrated to implement the input of the mobile phone and the input functions in some embodiments.

The mobile phone may further include at least one sensor 950 such as a light sensor 951, a motion sensor 952 and other sensors. Specifically, the light sensor 951 may include an ambient light sensor and a proximity sensor, where the ambient light sensor may adjust the luminance of the display screen 941 according to the brightness of ambient light, and the proximity sensor may close at least one of the display screen 941 or backlight. As one of the motion sensors 952, an accelerometer sensor may detect the magnitude of an accelerated speed in each direction (generally, three-axis), the size and direction of a gravity may be detected while resting, and the accelerometer sensor may be configured to identify an APP of a mobile phone gesture (e.g., horizontal and vertical screen switching, relevant games, and magnetometer gesture calibration), and vibration identification relevant functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the processor 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by means of the WiFi module 970, and it provides a wireless wideband internet access for the user. Although FIG. 7 shows the WiFi module 970, it may be understood that the WiFi module 570 does not belong to necessary components of the mobile phone and can be totally omitted without changing the essence of the disclosure as required.

The processor 980 is a control center of the mobile phone, and is configured to connect all parts of the whole mobile phone by utilizing various interfaces and lines, to run or execute at least one of the software program or the module stored in the memory 920, and to call data stored in the memory 820 to execute various functions and processing data of the mobile phone, so as to wholly monitor the mobile phone. Alternatively, the processor 980 may include one or more processing units. Preferably, the processor 980 may be integrated with an application processor and a modulation-demodulation processor, where the application processor mainly processes an operation system, a user interface, an application program and the like, and the modulation-demodulation processor mainly processes wireless communication. It may be understood that the modulation-demodulation processor may not be integrated into the processor 980.

The mobile phone may further include a power supply 990 (such as a battery) for supplying power to each component. Preferably, the power supply may be connected with the processor 980 logically via a power supply management system, so as to implement functions of charging, discharging and power consumption management by means of the power supply management system.

The mobile phone may further include a camera 9100, where the camera 9100 may include a front camera, an iris camera and a rear camera.

Although not shown, the mobile phone may also include a Bluetooth module, a flash, etc. The flash may include a front flash and a rear flash, the front flash may fill light for the front camera, and the rear flash may fill light for the rear camera. The front flash may include a front visible flash and a front infrared flash. The front visible flash is used to fill light for the front camera. The front infrared flash is used to fill light for the iris camera.

The embodiments of the disclosure also provide a computer storage medium, where the computer storage medium stores a computer program for electronic data exchange, the computer program enabling a computer to execute some or all actions described in any one method for recognizing a live face in the above-mentioned method embodiment.

The embodiments of the disclosure also provide a computer program product, which includes a non-transient computer-readable storage medium storing a computer program, where the computer program is operable to enable a computer to execute some or all actions described in any one method for recognizing a live face in the above-mentioned method embodiment.

It is important to note that for simple description, each of the above-mentioned method embodiments is expressed as a series of action combinations. However, a person skilled in the art should learn of that the disclosure is not limited by a described action sequence. That is because some actions may be executed in other sequences or at the same time according to the disclosure. Secondly, a person skilled in the art should also learn of that the embodiments described in the specification fall within preferable embodiments, and involved actions and modules may not be necessary for the disclosure.

In the above-mentioned embodiments, descriptions for each embodiment are emphasized respectively, and parts which are not elaborated in a certain embodiment may refer to relevant descriptions for other embodiments.

In some embodiments provided by the present application, it should be understood that the disclosed apparatus may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the present embodiment according to a practical requirement.

In addition, each function unit in each embodiment of the disclosure may be integrated into a processing unit, each unit may also exist independently, and two or more than two units may also be integrated into a unit. The above-mentioned integrated unit may be implemented in a form of hardware, and may also be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The above-mentioned memory includes: various media capable of storing program codes such as a U disk, a Read-Only Memory (ROM), a Random Access Memory (RAM), a mobile hard disk, a magnetic disk or an optical disk.

Those of ordinary skill in the art may understand that all or some actions in each method in the above-mentioned embodiments may be completed by instructing relevant hardware through a program, where the program may be stored in a computer-readable memory, and the memory may include: a flash disk, an ROM, an RAM, a magnetic disk or an optical disk.

The above is detailed description for the embodiments of the disclosure. The principle and implementation manner of the disclosure are elaborated herein by adopting a specific example. The description for the above-mentioned embodiments is only used to assist in understanding the method of the disclosure and the core idea thereof. Meanwhile, a person of ordinary skill in the art will change a specific implementation manner and an application scope according to the idea of the disclosure. To sum up, the contents of the present specification should not be interpreted as limitations to the disclosure.

The invention claimed is:

1. A method for recognizing a live face, comprising:
in response to a terminal device receiving a face image collection instruction, collecting, by the front camera, a first face image of a face when the front light emitting source is in a first state, the terminal device comprising the front light emitting source, the front camera and an Application Processor (AP);
collecting, by the front camera, a second face image of the face when the front light emitting source is at a first power;
determining, by the AP, whether a difference between an eyeball area proportion in the first face image and an eyeball area proportion in the second face image is larger than a preset threshold;
in response to the difference between the eyeball area proportion in the first face image and the eyeball area proportion in the second face image being smaller than or equal to the preset threshold and being larger than zero, collecting, by the front camera, a third face image of the face when the front light emitting source is at a second power, the second power being larger than the first power;
determining, by the AP, whether a difference between the eyeball area proportion in the first face image and an eyeball area proportion in the third face image is larger than the preset threshold; and in response to the difference between the eyeball area proportion in the first face image and an eyeball area proportion in the third face image being larger than preset threshold, determining, by the AR that the collected face images are images of a live face.

2. The method according to claim 1, wherein after determining, by the AP, that the collected face images are the images of the live face, the method further comprises:
taking, by the AP, an image with a larger eyeball area proportion out of the first face image and the second face image as a valid face image;
verifying, by the AP, whether the valid face image is matched with a pre-stored face image template; and
in response to the valid face image being matched with the pre-stored face image template, determining, by the AP, that face recognition is passed.

3. The method according to claim 1, further comprising:
in response to the difference between the eyeball area proportion in the first face image and the eyeball area proportion in the second face image being smaller than or equal to the preset threshold, determining, by the AP, that the collected face images are images of a non-live face.

4. The method according to claim 2, further comprising:
in response to the difference between the eyeball area proportion in the first face image and the eyeball area proportion in the second face image being smaller than or equal to the preset threshold, determining, by the AP, that the collected face images are images of a non-live face.

5. The method according to claim 1, wherein the front light emitting source comprises at least one of a front flash or a display screen backlight source.

6. The method according to claim 1, further comprising:
in response to the difference between the eyeball area proportion in the first face image and the eyeball area proportion in the second face image being larger than the preset threshold, determining, by the AP, that the collected face images are images of a live face.

7. A terminal device, comprising a front light emitting source, a front camera and an Application Processor (AP), wherein
the front camera is configured to, in response to the terminal device receiving a face image collection instruction, collect a first face image of a face when the front light emitting source is in a first state;
the front camera is further configured to collect a second face image of the face when the front light emitting source is at a first power;
the AP is configured to determine whether a difference between an eyeball area proportion in the first face image and an eyeball area proportion in the second face image is larger than a preset threshold;
the front camera is further configured to in response to the difference between the eyeball area proportion in the first face image and the eyeball area proportion in the second face image being smaller than or equal to the preset threshold and is larger than zero, collect a third face image of the face when the front light emitting source is at a second power, the second power being larger than the first power;
the AP is further configured to determine whether a difference between the eyeball area proportion in the first face image and an eyeball area proportion in the third face image is larger than the preset threshold; and
the AP is further configured to in response to the difference between the eyeball area proportion in the first face image and the eyeball area proportion in the third face image being larger than the preset threshold, determine that the collected face images are images of a live face.

8. The terminal device according to claim 7, wherein the AP is further configured to after determining that the collected face images are images of a live face, take an image with a larger eyeball area proportion out of the first face image and the second face image as a valid face image;

the AP is further configured to verify whether the valid face image is matched with a pre-stored face image template; and the AP is further configured to in response to the valid face image being matched with the pre-stored face image template, determine that face recognition is passed.

9. The terminal device according to claim 7, wherein the AP is further configured to in response to the difference between the eyeball area proportion in the first face image and the eyeball area proportion in the second face image being smaller than or equal to the preset threshold, determine that the collected face images are images of a non-live face.

10. The terminal device according to claim 8, wherein the AP is further configured to in response to the difference between the eyeball area proportion in the first face image and the eyeball area proportion in the second face image being smaller than or equal to the preset threshold, determine that the collected face images are images of a non-live face.

11. The terminal device according to claim 7, wherein the front light emitting source comprises at least one of a front flash or a display screen backlight source.

12. A non-transitory computer-readable storage medium, storing a computer program thereon, which when the computer program is executed by a computer, causes the computer to carry out one or more actions, the computer comprising a front light emitting source, a front camera and an Application Processor (AP), the one or more actions comprising:

in response to the terminal device receiving a face image collection instruction, collecting, by the front camera, a first face image of a face when the front light emitting source is in a first state;

collecting, by the front camera, a second face image of the face when the front light emitting source is at a first power;

determining, by the AP, whether a difference between an eyeball area proportion in the first face image and an eyeball area proportion in the second face image is larger than a preset threshold;

in response to the difference between the eyeball area proportion in the first face image and the eyeball area proportion in the second face image being smaller than or equal to the preset threshold and being larger than zero, collecting, by the front camera, a third face image of the face when the front light emitting source is at a second power, the second power being larger than the first power;

determining, by the AP, whether a difference between the eyeball area proportion in the first face image and an eyeball area proportion in the third face image is larger than the preset threshold; and in response to the difference between the eyeball area proportion in the first face image and an eyeball area proportion in the third face image being larger than preset threshold, determining, by the AR that the collected face images are images of a live face.

13. The terminal device according to claim 7, wherein the AP is further configured to in response to the difference between the eyeball area proportion in the first face image and the eyeball area proportion in the second face image being larger than the preset threshold, determine that the collected face images are images of a live face.

14. The storage medium according to claim 12, wherein the method further comprises:

in response to the difference between the eyeball area proportion in the first face image and the eyeball area proportion in the second face image being smaller than or equal to the preset threshold, determining, by the AP, that the collected face images are images of a non-live face.

15. The storage medium according to claim 12, wherein after determining, by the AP, that the collected face images are the images of the live face, the method further comprises:

taking, by the AP, an image with a larger eyeball area proportion out of the first face image and the second face image as a valid face image;

verifying, by the AP, whether the valid face image is matched with a pre-stored face image template; and in response to the valid face image being matched with the pre-stored face image template, determining, by the AP, that face recognition is passed.

16. The storage medium according to claim 15, wherein the method further comprises:

in response to the difference between the eyeball area proportion in the first face image and the eyeball area proportion in the second face image being smaller than or equal to the preset threshold, determining, by the AP, that the collected face images are images of a non-live face.

17. The storage medium according to claim 12, wherein the front light emitting source comprises at least one of a front flash or a display screen backlight source.

18. The storage medium according to claim 12, wherein the method further comprises:

in response to the difference between the eyeball area proportion in the first face image and the eyeball area proportion in the second face image being larger than the preset threshold, determining, by the AP, that the collected face images are images of a live face.

* * * * *